United States Patent Office 2,768,908
Patented Oct. 30, 1956

2,768,908

COATING COMPOSITION, METHOD OF COATING METAL SURFACES THEREWITH AND RESULTANT ARTICLE

Neville Leverne Cull, Baker, La., assignor to Esso Research and Engineering Company, a corporation of Delaware No Drawing. Application May 16, 1955,
Serial No. 508,774

6 Claims. (Cl. 117—103)

This invention relates to corrosion resistant films and more particularly relates to the use of modified polymer drying oils in the preparation of such films.

It is well known that durable varnish and enamel films can be prepared from the synthetic drying oils obtained by the polymerization of conjugated diolefins of 4 to 6 carbon atoms with or without other monomers, such as styrene, in the presence of alkali-metal catalysts. Films suitable for many applications can easily be prepared from these oils by air-drying or baking. However, it has not been found possible to prepare films from these oils which can withstand the attack of strong mineral acids such as sulfuric or hydrochloric acids. It is highly desirable that films resistant to the attack of these acids be used as protective coating and liners for metal pipes and fittings used in the handling of these acids. When films of the polymer oils are used to line pipes, etc. used in the service of these mineral acids, it has been found that the films fail within a short time, particularly when concentrated acids are used.

Accordingly, therefore, it is the major object of this invention to provide a method for improving the resistance of polymer oil films to attack by mineral acids.

Another object of this invention is to provide films of oily polymers of conjugated diolefins which films have increased resistance to the attack of sulfuric and hydrochloric acids.

Those and other objects of this invention are accomplished by adding 0.1 to 5% by weight of an organo silicon compound, such as ethyl ortho silicate to the varnish containing the polymer oil.

In the practice of one embodiment of this invention, a liquid copolymer of 80% butadiene and 20% styrene having a molecular weight less than 1000 and preferably less than 5000 and having a viscosity in the range of 0.3 to 20 poises, preferably in the range of 0.5 to 2 poises is mixed with 1.8% of ethyl silicate and 1 wt. percent of a metal drier and coated on the inside of the metal pipe, valve or other fitting to be contacted with the mineral acid. The coated surface is then baked in a non-oxidizing atmosphere at 350–475° F. to provide an improved acid-resistant coating or liner.

The synthetic oils to which the present invention is applicable are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e. g. with 0 to 40% of styrene, styrenes having alkyl groups substituted on the ring such as para methyl styrene, dimethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benozyl peroxide or cumenehydroperoxide, or in the presence of metallic sodium when the monomers consist of a diolefin or of a mixture of a diolefin with a styrene compound. Under proper conditions the emulsion polymerization technique may also be adapted to the preparation of drying oils to which the present invention is applicable. Suitable polymerization methods are illustrated below. Throughout the present description it will be understood that all proportions are expressed on a weight basis unless otherwise specified.

Synthesis method A

For example, 100 parts of butadiene-1,3, 50 parts of straight run mineral spirits boiling between 150 and 200° C. (Varsol), 3 parts of t-butyl hydroperoxide (60% pure) and 0.75 part of diisopropyl xanthogen disulfide are heated in a closer reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U. S. Patent No. 2,586,594 of Arundale et al., filed on October 29, 1947, which describes alternative monomers, catalysts, reaction diluents, polymerization modifiers, suitable ranges of proportions of the various ingredients, suitable ranges of polymerization conditions, etc.

Synthesis method B

An alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Fnally, additional hydrocarbon solvent is preferably distilled off until a product containing about 50%–95% non-volatile matter is obtained, the non-volatile matter being a drying oil having a molecular weight below 10,000, preferably between about 2,000 to 5,000.

Again it will be understood that the described sodium polymerization method may be varied considerably as by omitting the styrene co-reactant; or by adding the styrene only after the polymerization of butadiene monomer had begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60 and 200° C., e. g., butane, benzene, xylene, naphtha, cyclo-hexane and the like. The diluents are usually used in amounts ranging from 50 to 500 parts per 100 parts of monomer. The reaction temperature may vary between about 40° C. and 100° C., preferably around 65 to 85° C. As a catalyst, 0.1 to 10 parts of dispersed metallic sodium is used per 100 parts of monomers, sodium particle sizes below 100 microns being particularly effective.

Furthermore, the present invention is also applicable to drying oils of hydrocarbon origin which have been modified by reaction with a small amount of maleic anhydride, acrylonitrile or of thioglycolic acid, the details of the modifying treatment being disclosed in patents of A. H. Gleason 2,652,342 filed on July 1, 1949, and 2,683,162 filed on July 23, 1949.

The mode of operation of the present invention as well as the improvement obtained thereby in preparing corrosion resistant films and liners is shown in the following examples.

*Example I*

A polymer oil was prepared as described in synthesis method B and three coats baked on to ⅛" x 2" x 4" carbon steel plates with and without a cobalt napthenate drier. The films were baked on in a nitrogen atmosphere using temperatures of from 350° F. for the first coat to 475° F. for the final coat. After baking, the films were tested by immersing in 10% and 65% sulfuric acid maintained at refluxing temperature for at least 24 hours. With 10% sulfuric acid all the plates failed badly at the edges within 24 hours. With the 65% acid the entire film was blackened and blistering occurred where the plate was exposed to the acid vapors.

*Example II*

Another experiment similar to Example I was carried out in which the steel plates were cleaned prior to baking on the films either by washing with xylene or by washing with alkali followed by pickling over night with 5% sulfuric acid containing 0.01% thiourea. Four coats of polymer oil were baked on the cleaned metal surface; the first coat was baked at 250° F., the second at 300° F., the third at 350° F. and the fourth at 400° F. under a nitrogen blanket. The coated plates were then exposed to the attack of 65% sulfuric acid at a reflux temperature of 290° F. for 48 hours. In all cases the films failed, the edges and surfaces being attacked badly. Similar exposure to concentrated hydrochloric acid resulted in complete failure of the film within four hours.

*Example III*

Two experiments similar to Example I were carried out in which three coats of polymer oil containing 1% cobalt naphthenate drier and 1.8% ethyl ortho silicate were baked on steel panels cleaned by overnight pickling and subjected to the attack of 10% sulfuric acid for 24 hours and 65% sulfuric acid for 48 hours, both at reflux temperatures. The result showed that while the film failed at the edges there was marked improvement over the results reported in Examples I and II. The plate subjected to 65% acid withstood the attack best of all.

The data reported in the above examples show that unmodified films of polymer oil fail badly when attacked by 10% and 65% sulfuric acid and by concentrated hydrochloric acid. The film failure was extensive for the 65% acid. Cleaning of the plates as by pickling prior to baking has little effect on the corrosion resistance of the films. The addition of 1.8% ethyl silicate to the oil, however, improves the resistance of the films particularly with respect to the attack of the 65% acid.

The nature of the present invention having been thus fully set forth and specific examples of the same given, what is claimed as new and useful and desired to be secured by Letters Patent is:

1. A coating composition comprising a liquid butadiene polymer containing .1 to 5% by weight of ethyl ortho silicate.

2. A coating composition comprising a liquid copolymer of 80% butadiene and 20% styrene containing 1.8% by weight of ethyl ortho silicate.

3. A structure comprising a metal surface coated with a baked film of a liquid butadiene polymer containing .1 to 5% by weight of ethyl ortho silicate.

4. A structure comprising a metal surface coated with a baked film of a liquid copolymer of 80% butadiene and 20% styrene containing 1.8% by weight of ethyl ortho silicate.

5. A method for protecting metal surfaces against corrosive attack by mineral acids which comprises coating the metal surface with a liquid butadiene polymer containing 1.8% by weight of ethyl ortho silicate and baking the film to the metal.

6. A method for protecting metal surfaces against corrosive attack by mineral acids which comprises coating the metal surface with a plurality of coats of a liquid copolymer of 80% butadiene and 20% styrene containing 1.8% by weight of ethyl ortho silicate and baking each coat separately, the first at 350° F. and the remainder at 400° F. under a non-oxidizing atmosphere.

References Cited in the file of this patent

UNITED STATES PATENTS

| | | |
|---|---|---|
| 2,258,221 | Rochow | Oct. 7, 1941 |
| 2,337,424 | Stoner | Dec. 21, 1943 |
| 2,395,550 | Iler | Feb. 26, 1946 |
| 2,572,906 | Berringer | Oct. 30, 1951 |